(12) United States Patent
Vergnaud et al.

(10) Patent No.: US 6,715,087 B1
(45) Date of Patent: Mar. 30, 2004

(54) METHOD OF PROVIDING A REMOTE POWER FEED TO A TERMINAL IN A LOCAL AREA NETWORK, AND CORRESPONDING REMOTE POWER FEED UNIT, CONCENTRATOR, REPEATOR, AND TERMINAL

(75) Inventors: Gérard Vergnaud, Franconville (FR); Luc Attimont, Saint Germain en Laye (FR); Jannick Bodin, Garches (FR); Raymond Gass, Bolsenheim (FR); Jean-Claude Laville, Nanterre (FR)

(73) Assignee: Alcatel, Paris (FR)

( * ) Notice: Subject to any disclaimer, the term of this patent is extended or adjusted under 35 U.S.C. 154(b) by 658 days.

(21) Appl. No.: 09/703,654

(22) Filed: Nov. 2, 2000

(30) Foreign Application Priority Data

| Nov. 4, 1999 | (FR) | 99 13834 |
| Apr. 14, 2000 | (FR) | 00 04834 |
| Jul. 3, 2000 | (FR) | 00 08592 |

(51) Int. Cl.$^7$ .............................................. G06F 1/26
(52) U.S. Cl. ....................................... 713/300; 713/340
(58) Field of Search .................................. 713/300, 330, 713/340

(56) References Cited

U.S. PATENT DOCUMENTS

| 4,389,694 A | * | 6/1983 | Cornwell, Jr. ................ 361/48 |
| 5,121,482 A | * | 6/1992 | Patton ............................ 710/16 |
| 5,506,900 A | * | 4/1996 | Fritz ............................ 379/402 |
| 5,530,748 A | * | 6/1996 | Ohmori ....................... 379/413 |
| 5,991,885 A | * | 11/1999 | Chang et al. ................ 713/300 |
| 6,175,556 B1 | * | 1/2001 | Allen et al. .................. 370/293 |

FOREIGN PATENT DOCUMENTS

| EP | 0 981 227 A2 | 2/2000 |
| WO | WO 96/23377 | 8/1996 |

OTHER PUBLICATIONS

Bearfield, J.M.: "Control the Power Interface of USB's Voltage Bus" Electronic Design, US, Penton Publishing, Cleveland, OH, vol. 45, No. 15, Jul. 27, 1997, pp. 80, 82, 84, 86 XP00078289 ISSN: 0013–48728.

* cited by examiner

*Primary Examiner*—Dennis M. Butler
(74) *Attorney, Agent, or Firm*—Sughrue Mion, PLLC

(57) ABSTRACT

A method for sending a remote power feed to a terminal in a local area network.

A repeater of the local area network produces a detection signal in a line to which a remote terminal is connected, and the signal has an energy level that will not damage the terminal.

The presence of a remote terminal adapted to receive a remote power feed via the repeater is detected by detecting the presence of a predetermined impedance in the terminal, and power is supplied to the terminal via the repeater in response to detection of the presence of the terminal.

29 Claims, 13 Drawing Sheets

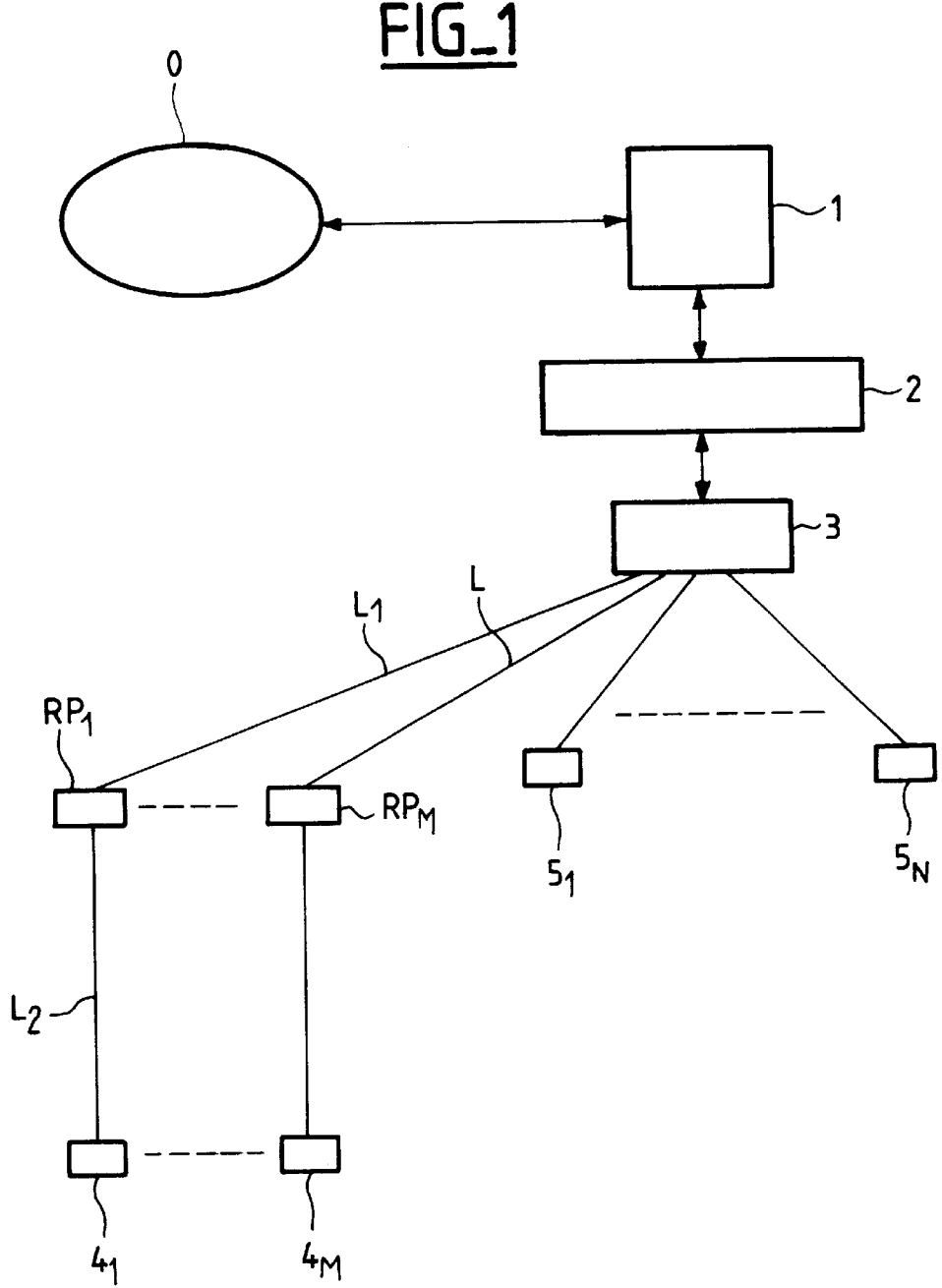

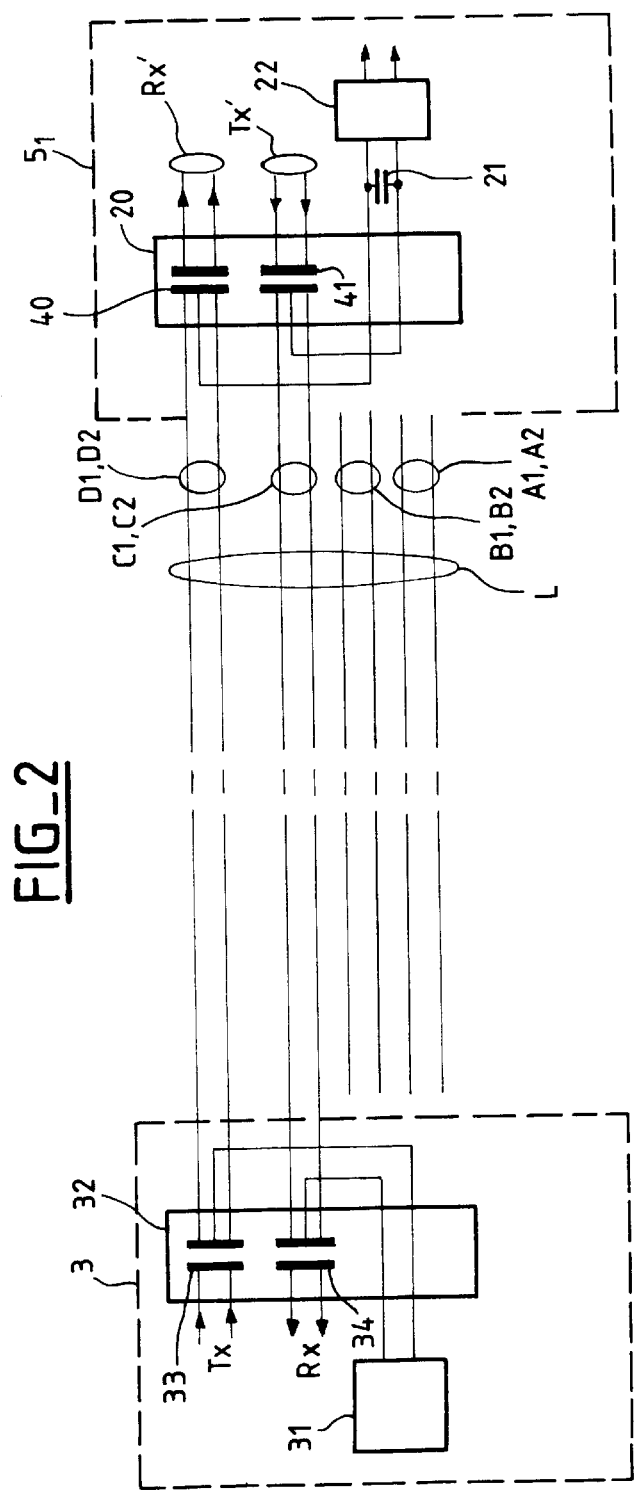

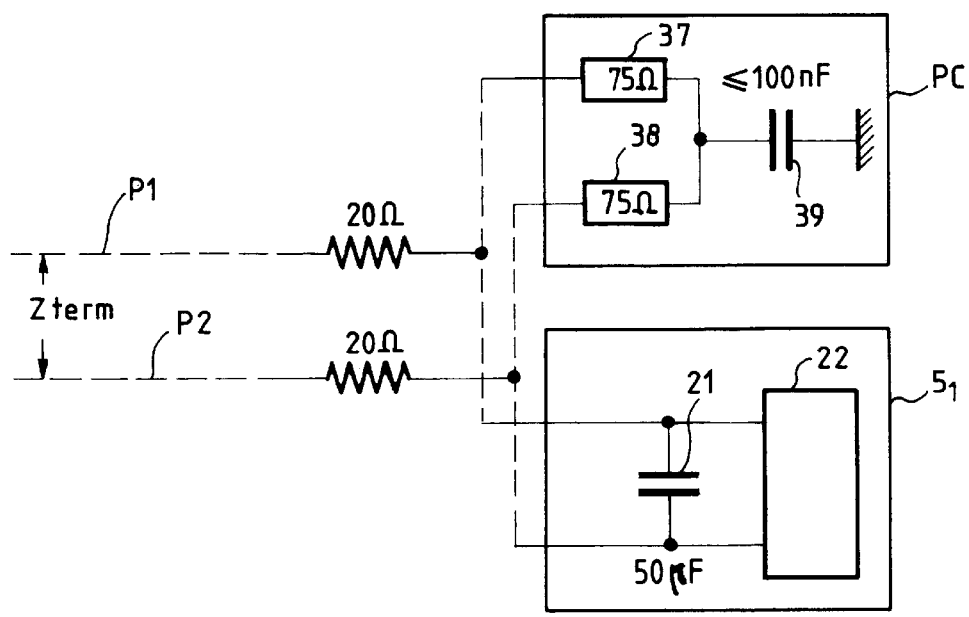

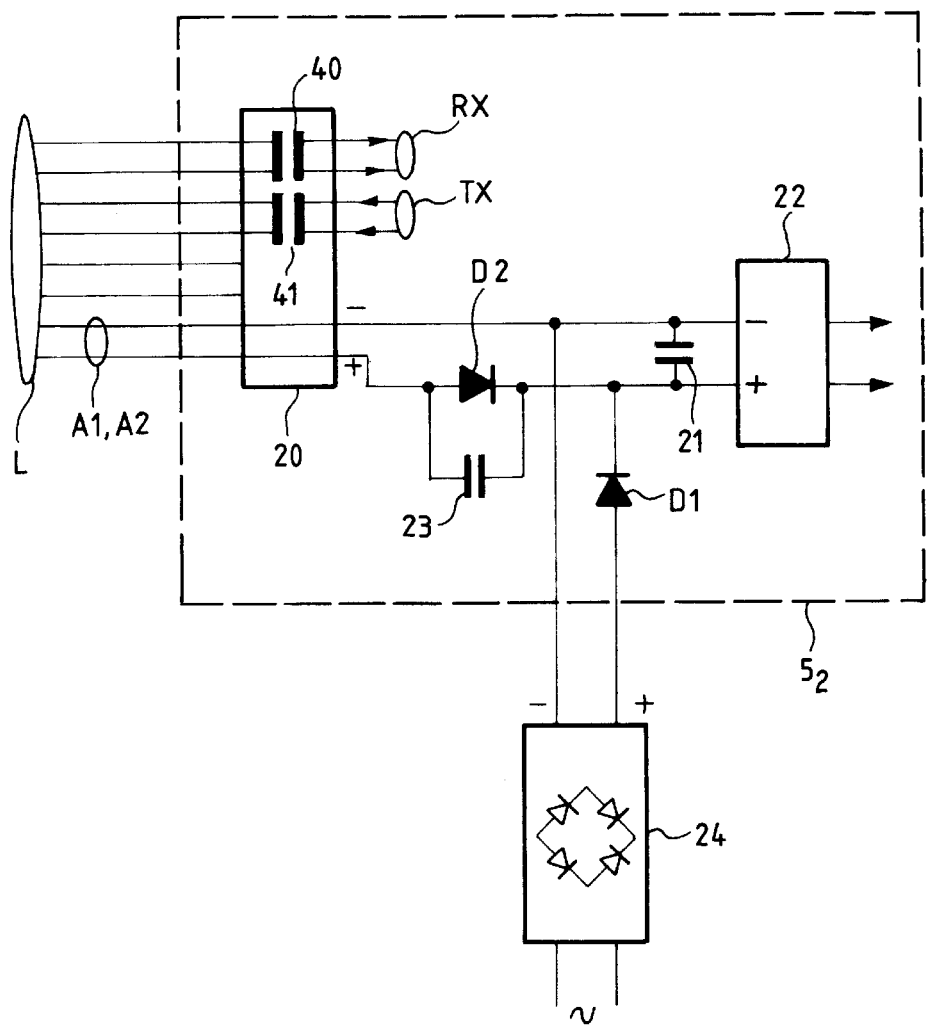
FIG_4

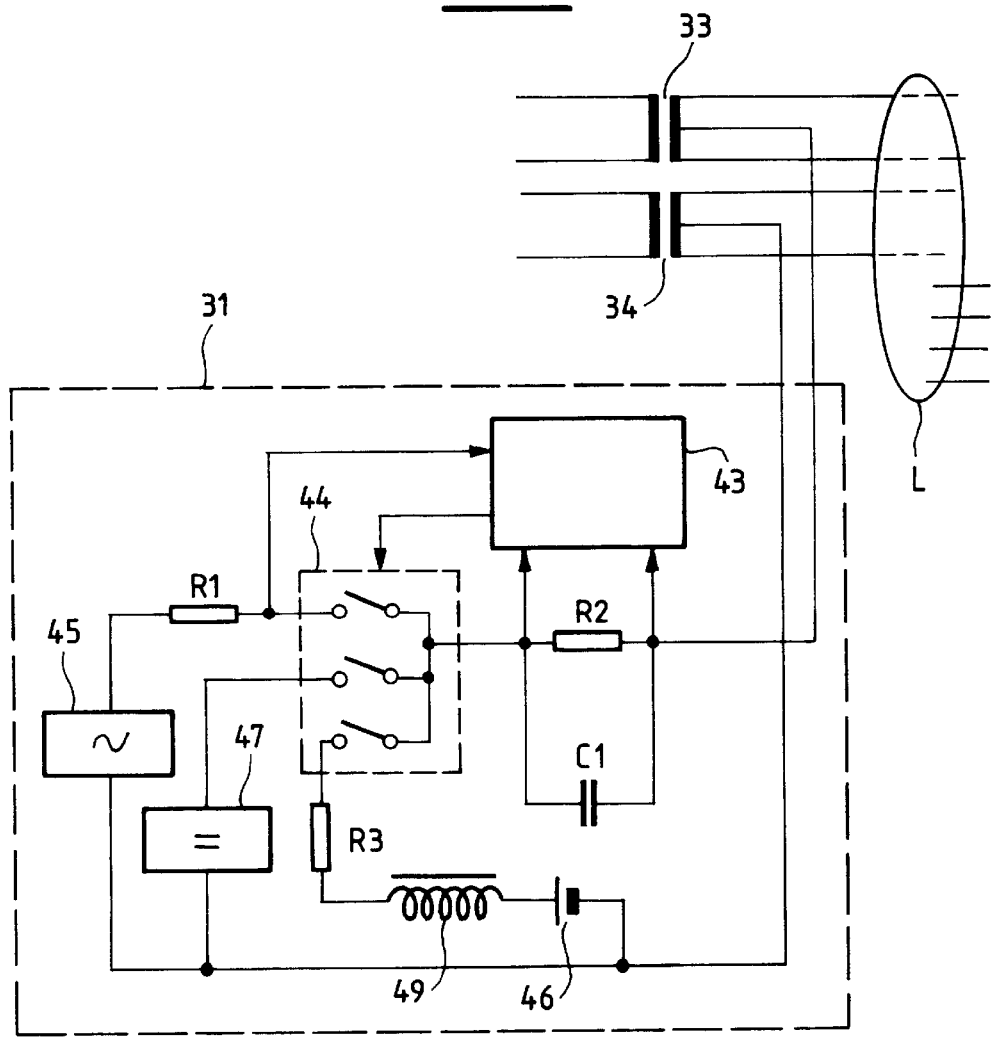

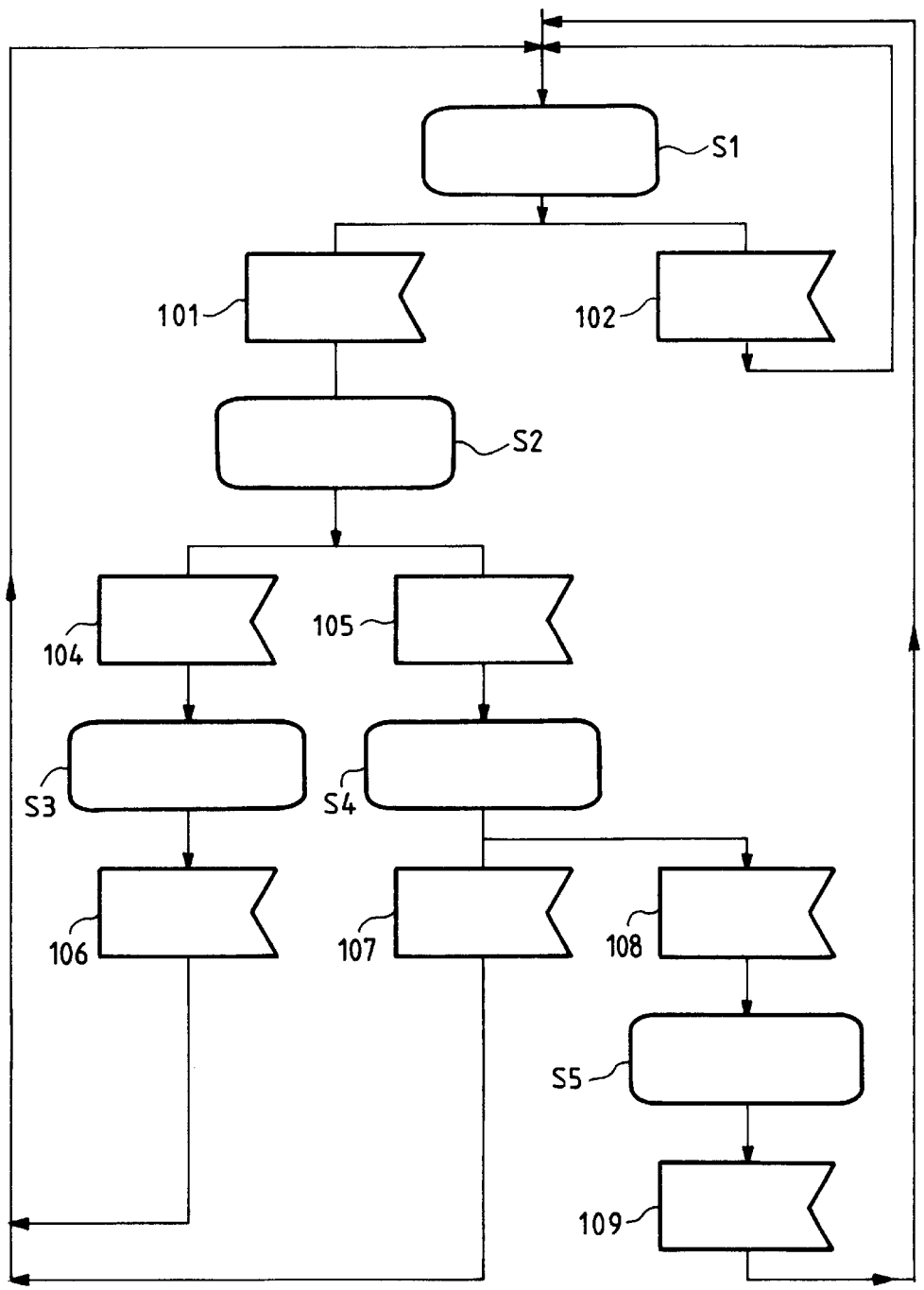
FIG_6

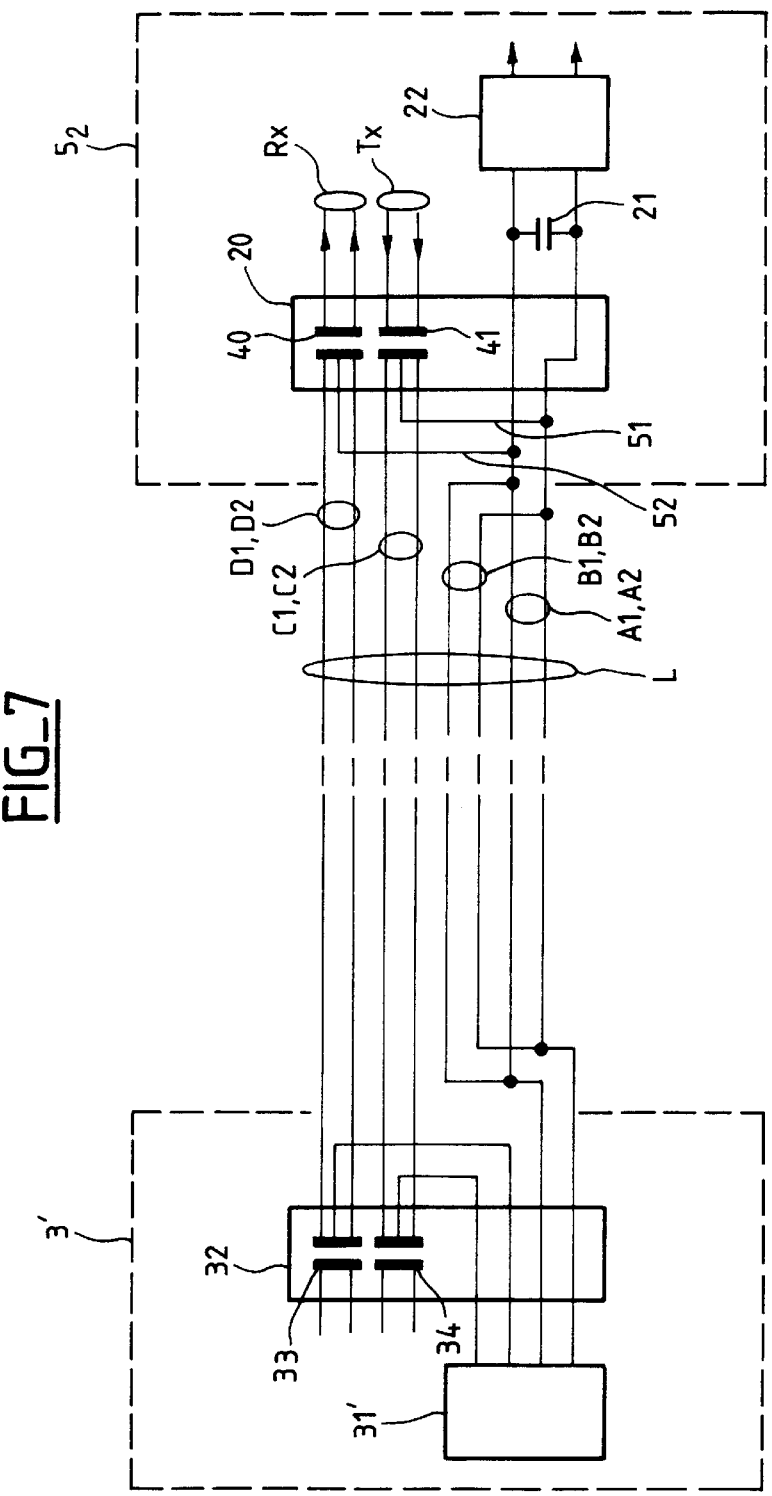
FIG_7

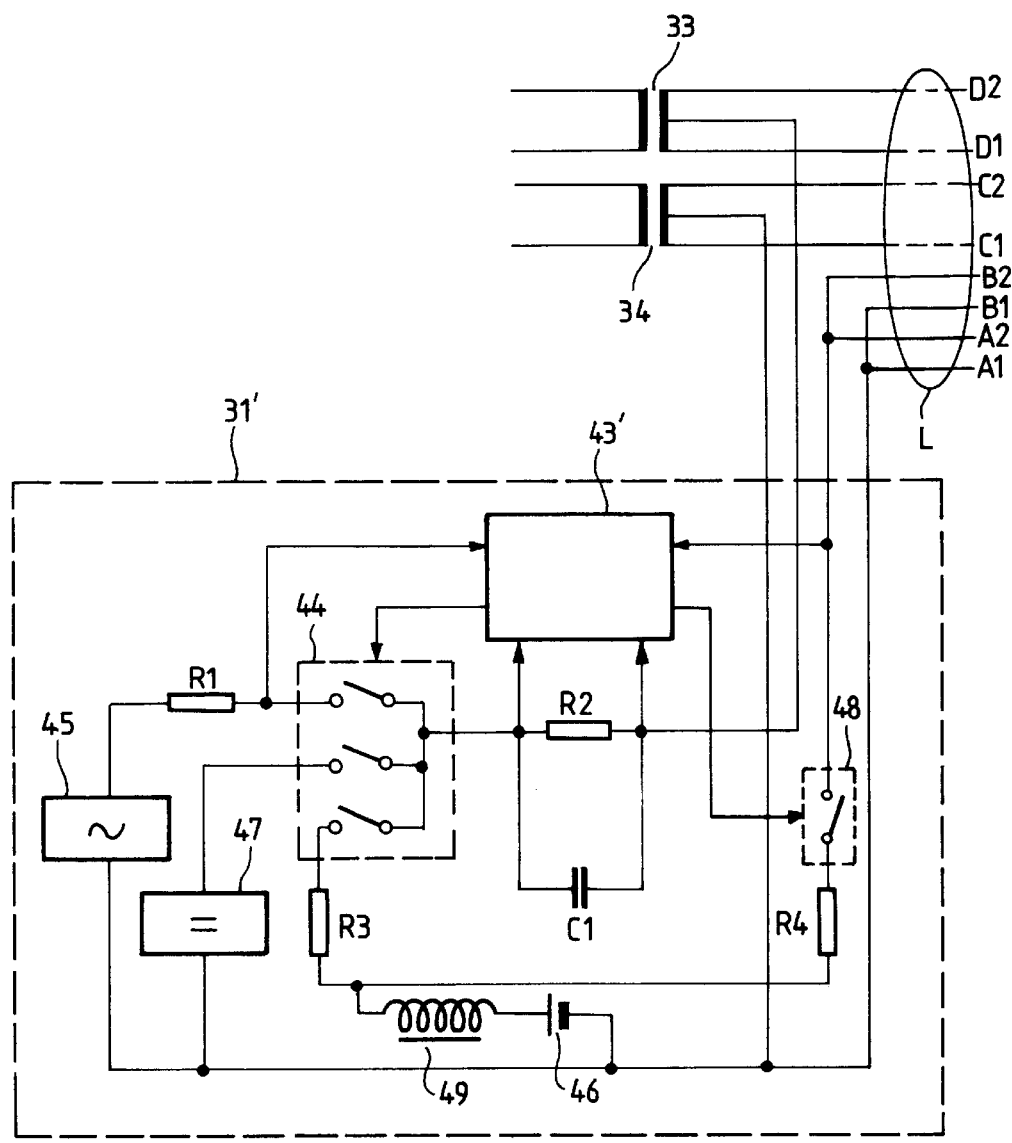
FIG_8

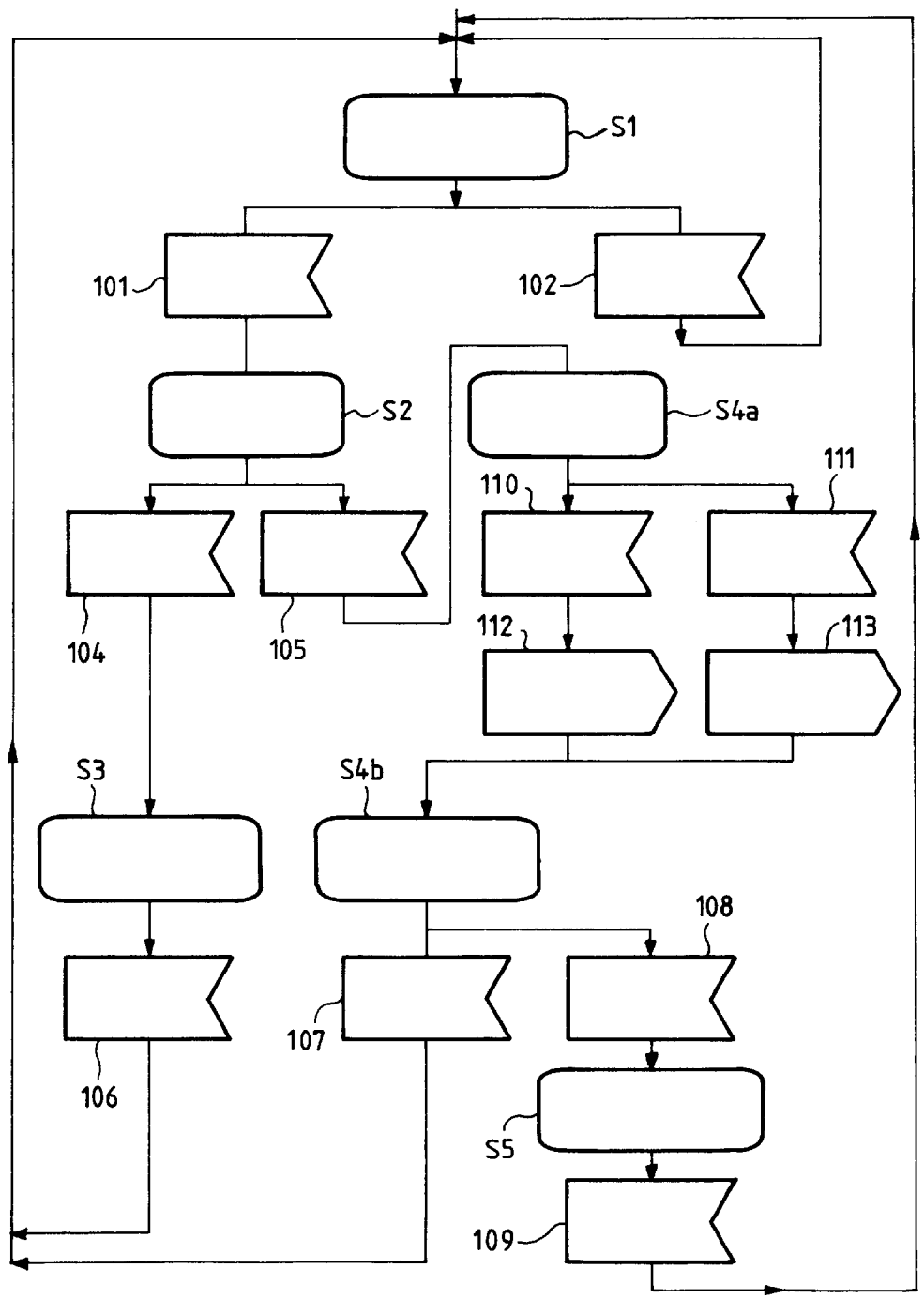

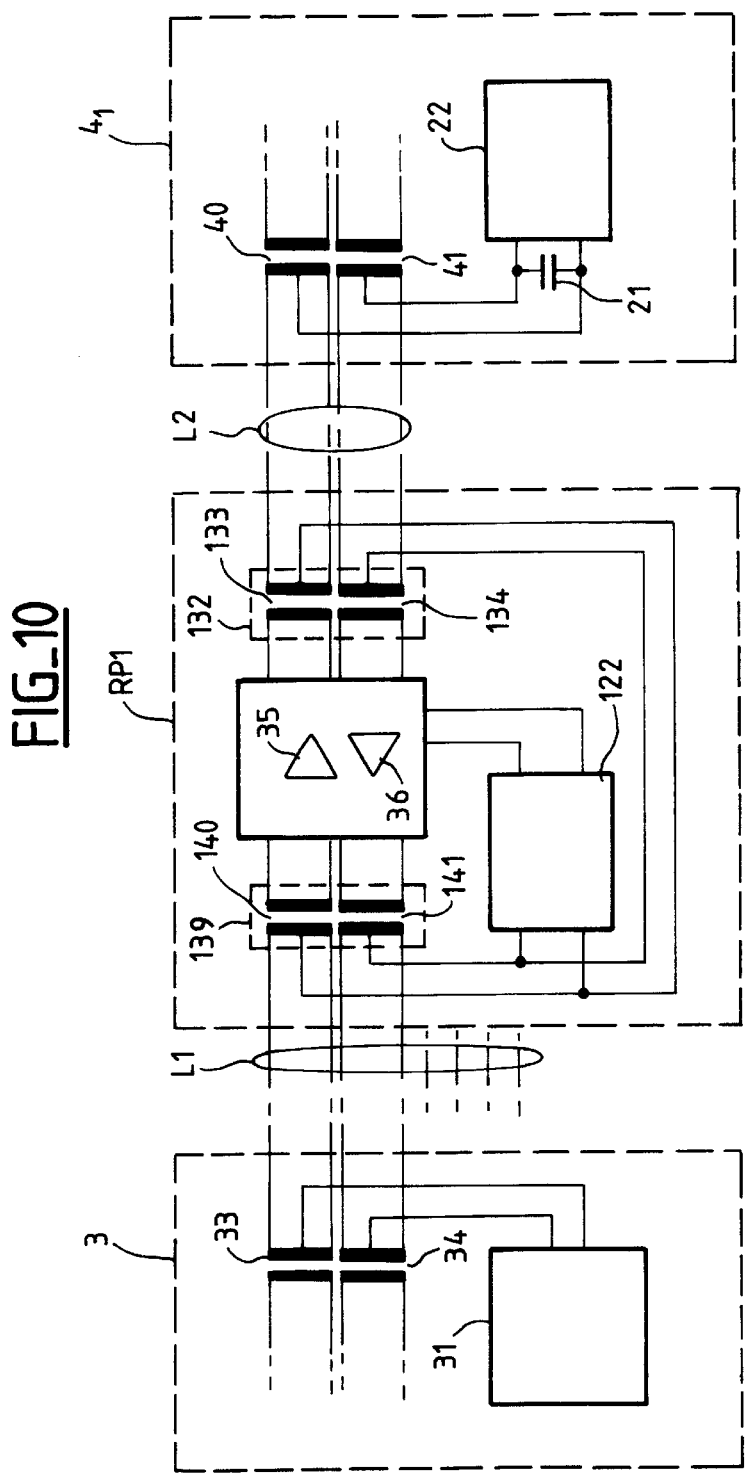
FIG_10

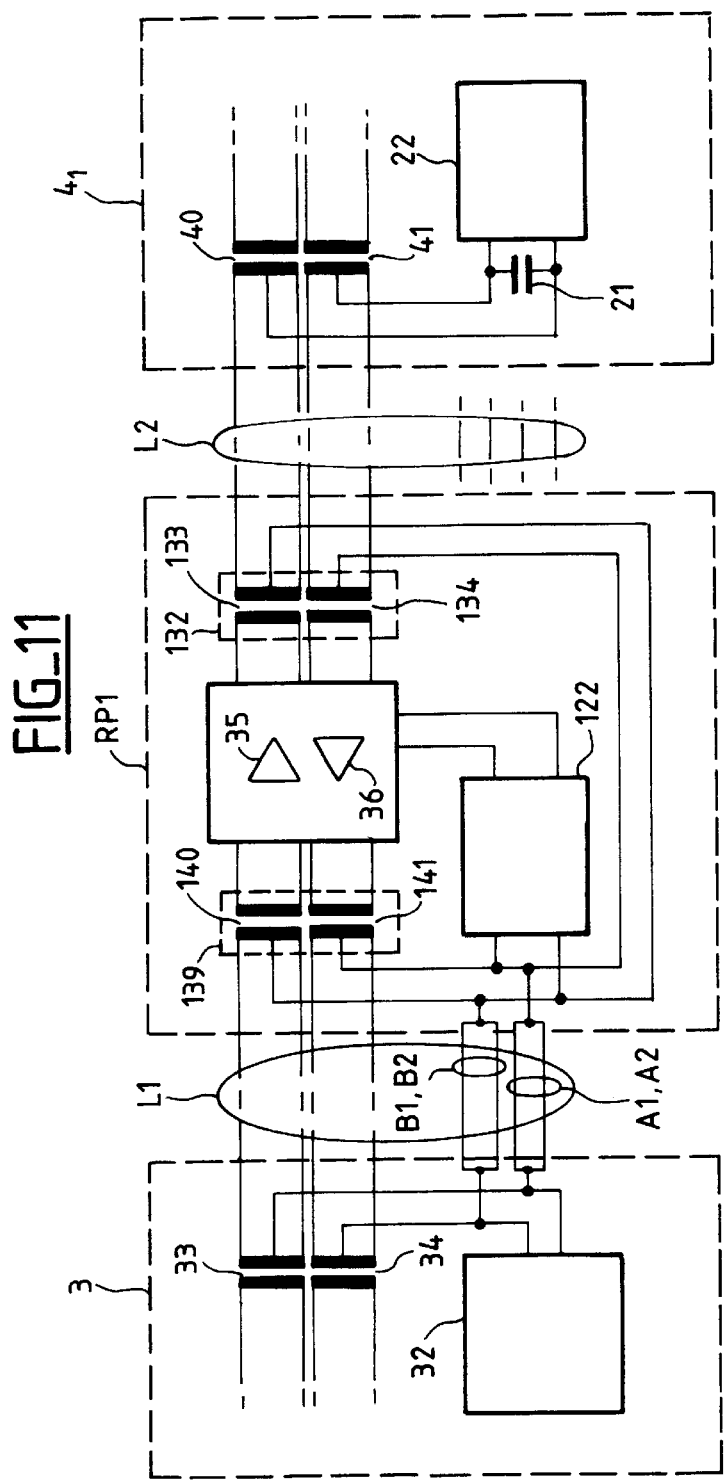

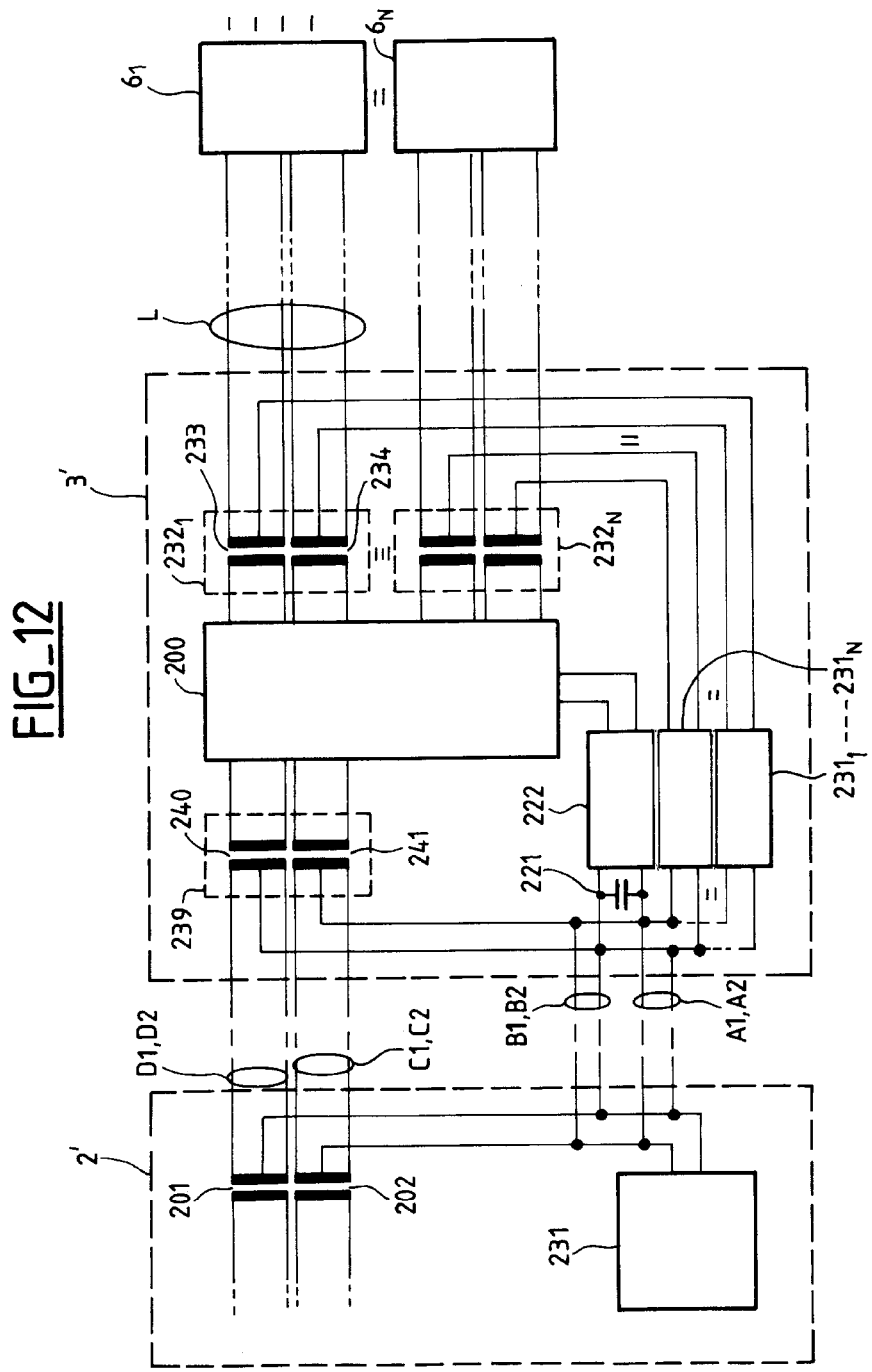
FIG_12

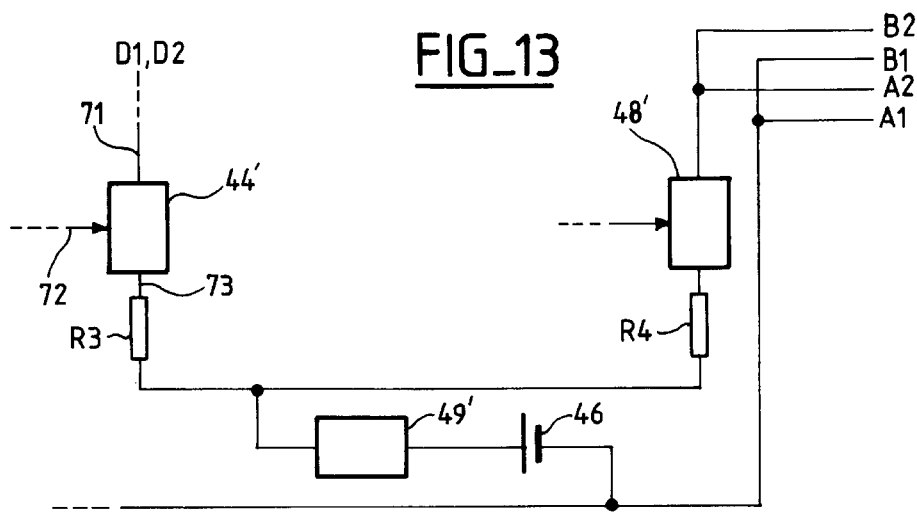
FIG_13
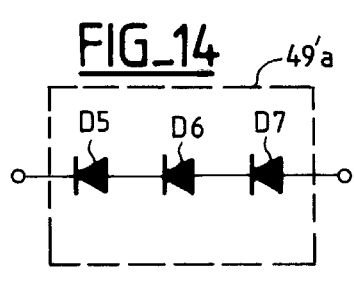
FIG_14
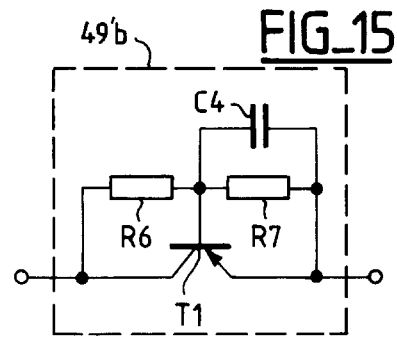
FIG_15
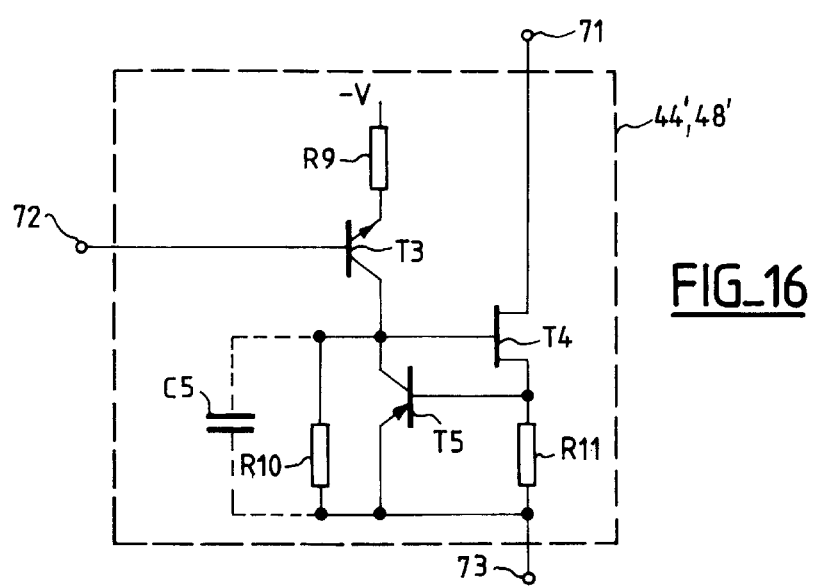
FIG_16

METHOD OF PROVIDING A REMOTE POWER FEED TO A TERMINAL IN A LOCAL AREA NETWORK, AND CORRESPONDING REMOTE POWER FEED UNIT, CONCENTRATOR, REPEATER, AND TERMINAL

The present invention relates generally to a data processing local area network, for example an Ethernet network. To be more precise, the invention relates to a method of providing a remote power feed to a terminal in a data processing local area network and also to a remote power feed unit, a concentrator, a repeater (also known as a hub), and a terminal adapted to implement the method.

BACKGROUND OF THE INVENTION

FIG. 1 is a diagram showing, by way of illustrative and non-limiting example only, an Ethernet data processing local area network which includes a local area network server 1, a switch 2, a repeater 3 and N terminals $4_1$ to $4_N$ which include telephones operating in Voice over IP (VoIP) mode. The server 1 is connected to the Internet 0 and receives packets complying with the Internet protocol (TCP/IP). The packets of a given call are routed via the switch 2 and the repeater 3 to a terminal such as the telephone $4_1$ which is connected to the repeater by a 8-wire line L terminated with RJ45 connectors.

The terminals connected to a data processing local area network (for example personal computers, printers, etc.) are conventionally connected locally to the mains electrical power supply. 110 V or 220 V power cords independent of the data connections are therefore used to supply power to the terminals. This solution makes installation of the local area network more difficult:

Using two cables causes problems of congestion which can additionally impede the free movement of persons.

It creates electrical hazards.

In the case of a telephone, a local connection to the mains electrical power supply has the additional drawback that the telephone is out of service in the event of a mains power outage, in particular in the event of a fire or natural disaster. This is why conventional telephones receive a remote power feed from their local exchange, which includes emergency batteries.

It is therefore desirable for some of the terminals connected to a data processing local area network to be provided with a remote power feed via the same connection as is used to send and receive data. It is also desirable to be able to install the remote power feed unit anywhere on the line L (either inside or outside a repeater 3), to enable easy addition to an existing network.

One way of transmitting a remote power feed current is to use two of the eight wires of the line L: four other wires form two pairs of wires respectively used to transmit and to receive data. Another method, referred to as a phantom circuit, connects the two terminals of a power supply generator in the remote power feed unit to respective center-taps of a winding of a transformer connected to the pair for receiving data and a winding of another transformer connected to the pair for sending data. At the terminal, the supply voltage is obtained between respective center-taps of a winding of a transformer connected to the pair for receiving data and a winding of another transformer connected to the pair for sending data.

In both cases, providing a remote power feed to the terminal via the data processing local area network has the disadvantage that the remote power feed unit supplies power to a terminal "blind". The RJ45 connector at the end of the line L could be plugged into a terminal other than a telephone (for example a personal computer, a printer, etc.). There is a risk of damaging the electrical circuits of that terminal. The RJ45 connector of a terminal is generally used in the following manner:

Four of the eight wires are separated into two pairs for respectively sending and receiving data. The terminal includes a transformer having one winding connected to the receive pair and a transformer having one winding connected to the send pair, each of these windings having a center-tap which can be connected to a reference potential via a low-resistance resistor.

Four other wires are not used and are grounded, often via a combination of resistors and capacitors, to eliminate any crosstalk induced by the data signals in the first four wires and to reduce unwanted electromagnetic emission. If a relatively high remote power feed voltage, for example 48 volts, is applied to that combination of resistors and capacitors, or to the resistors connected to the center-taps of the transformers, the resistors can be destroyed by the current flowing in them.

OBJECTS AND SUMMARY OF THE INVENTION

The invention therefore aims to solve this problem by proposing a method of providing a remote power feed to a terminal in a data processing local area network and systems for implementing the method which prevent all risk of damage if a terminal is plugged in which is not one of the terminals adapted to receive a remote power feed via the network.

The invention firstly provides a method of providing a remote power feed to a terminal in a local area network, the method entailing:

producing at least one detection signal on at least two conductors of a line for connecting the local area network to a remote terminal, that signal having an energy such that the terminal cannot be damaged under any circumstances, detecting the presence of a remote terminal adapted to receive a remote power feed by detecting the presence of predetermined impedance in the remote terminal on the basis of a current created by the test signal in that line, and sending a power supply current in that line when the presence of a terminal adapted to receive a remote power feed is detected.

The above method prevents all risk to the terminals because the remote power feed current is sent only if the terminal has been identified as one which is adapted to receive a remote power feed. The intensity and duration of the detection signal are chosen so that the operation of detecting the terminal cannot cause any damage if the terminal is not one which is adapted to receive a remote power feed.

In one particular embodiment of the invention, to detect a predetermined impedance in the remote terminal, the presence of a capacitor in the remote terminal is detected.

The resulting method is particularly simple to implement. The capacitance of the capacitor is chosen so that it is significantly different from that of the line. Measuring a capacitive impedance then indicates a terminal adapted to receive a remote power feed. The capacitor can shunt two conductors used for the remote power feed without affecting transmission of the remote power feed current, which is a direct current.

In another particular embodiment of the invention, to detect a predetermined impedance in the remote terminal, the presence of a short-circuit in the remote terminal is detected.

The resulting method is particularly simple to implement, and therefore advantageous, when the short-circuit can be applied between two conductors of the line which are chosen so that the short-circuit does not impede either the remote power feed or sending and receiving data.

In a preferred embodiment of the invention, to detect the presence of a capacitor in the remote terminal:

- an alternating current test signal is applied to the line and it is verified that the remote terminal does not behave like an open circuit for that signal,
- a direct current test signal is applied to the line and it is verified that the remote terminal behaves like an open circuit for that signal, and
- the method concludes that a terminal adapted to receive a remote power feed is present if the results of both tests are positive.

In one particular implementation of the invention a remote power feed method is suited to a line including two pairs for sending/receiving data and each enabling the transmission of a remote power feed current in common mode and other conductors which can also be used for a remote power feed. In the method, detecting a remote terminal adapted to receive a remote power feed entails:

- performing a first test to detect if the terminal is adapted to receive a remote power feed via the two pairs for sending/receiving data,
- performing a second test to detect if the terminal is adapted to receive a remote power feed via the other conductors that can also be used for a remote power feed,
- sending a remote power feed current in the two pairs for sending/receiving data only if the first test shows that the terminal is adapted to receive a remote power feed via those two pairs, and
- sending a remote power feed current in the other conductors that can also be used for a remote power feed only if the second test shows that the terminal is adapted to receive a remote power feed via those other conductors.

In one particular embodiment of the invention the first test consists of detecting the presence of a first predetermined impedance in the terminal on the basis of a current created by a first test signal in the two pairs for sending/receiving data and the second test consists of detecting the presence of a second predetermined impedance in the terminal on the basis of a current created by a second test signal in the other conductors.

One of the two predetermined impedances is preferably a short-circuit and the other predetermined impedances is preferably a capacitance.

The resulting method enables the remote power feed current to be increased, because it enables up to eight conductors of an Ethernet line to be used and can discriminate between several types of terminal adapted to receive a remote power feed that have different power consumptions. For example:

If it detects that the terminal is not one which is adapted to receive a remote power feed via the available conductors in an Ethernet line, but is adapted to receive a remote power feed via a phantom circuit using the pairs for sending and receiving data, this means that the terminal has a low power consumption, in which case it is possible and sufficient to send a remote power feed current via the phantom circuit.

If it detects that the terminal is adapted to receive a remote power feed via the available conductors in an Ethernet line and is also adapted to receive a remote power feed via a phantom circuit using the pairs for sending and receiving data, this means that the terminal has a high power consumption, in which case it is possible and necessary to send a remote power feed current via the phantom circuit and a remote power feed current via the available conductors.

The invention secondly proposes a terminal adapted to implement the above remote power feed method, the terminal including at least one predetermined impedance connected to at least two conductors of the line and which identifies the terminals adapted to receive a remote power feed.

The predetermined impedance preferably includes a very much higher capacitance than that of terminations routinely connected to the ends of the line in terminals that are not adapted to receive a remote power feed but are adapted to be connected to the local area network concerned.

The invention thirdly proposes a remote power feed unit for implementing the method and which includes:

- means for producing at least one detection signal on at least two conductors of a line for connecting the local area network to a remote terminal, that signal having an energy such that the terminal cannot be damaged under any circumstance,
- means for detecting the presence of a remote terminal adapted to receive a remote power feed by detecting the presence of a predetermined impedance in the remote terminal on the basis of a current created by the test signal in that connection, and
- means for sending a power supply current in the line when the presence of a terminal adapted to receive a remote power feed is detected.

One particular advantage of the above remote power feed unit is that it can be installed anywhere on the line (inside or outside a repeater), because it can operate entirely independently of the units of a repeater.

Another object of the present invention is to propose a repeater and a concentrator which can be inserted (separately or together) between a remote power feed unit and a terminal (or another equipment unit adapted to receive a remote power feed, such as a repeater or a concentrator) without interfering with discrimination or the remote power feed.

The present invention fourthly proposes a repeater adapted to receive a remote power feed and adapted to be included between a network equipment unit including a remote power feed unit and another network equipment unit in a local area network,

- the repeater including a power supply unit powered by a remote power feed and whose input is connected in parallel with the power supply input of the other network equipment unit to the conductors of the line that provide the remote power feed, and
- the power supply unit having an input impedance whose modulus is very much higher than the modulus of the input impedance of the power supply unit which is characteristic of equipment units adapted to receive a remote power feed likely to be connected downstream of that repeater.

The resulting repeater does not interfere with discriminating between an equipment unit that is adapted to receive a remote power feed and an equipment unit that is not adapted to receive a remote power feed, because the power supply input impedance detected by an upstream remote power feed unit remains approximately the same when the power supply input impedance of the repeater is connected in parallel with that of another network equipment unit. Also, the other network equipment unit and the repeater both receive a remote power feed from the upstream remote power feed unit, because their respective power supply inputs are connected in parallel to the conductors of the line that provide the remote power feed.

The present patent application fifthly proposes a concentrator adapted to be inserted into a line between a network equipment unit including a remote power feed unit and at least one other network equipment unit in a local area network, the concentrator including, for each of its ports adapted to be connected to another network equipment unit, a remote power feed unit which includes:

means for producing at least one detection signal on at least two conductors of a line for connecting the concentrator to another network equipment unit, that signal having an energy such that the other network equipment unit cannot be damaged under any circumstances, means for detecting the presence of another equipment unit adapted to receive a remote power feed by detecting the presence of a predetermined impedance in that other equipment unit on the basis of a current created by the test signal in the line, and means for sending a power supply current in the line when the presence of another equipment unit adapted to receive a remote power feed is detected.

The resulting concentrator provides a remote power feed to downstream equipment units that are adapted to receive a remote power feed and does not provide a remote power feed to equipment units that are not adapted to receive a remote power feed because it includes an additional remote power feed unit specific to each of its ports, that additional remote power feed unit operating in a similar manner to but independently of the upstream remote power feed unit in a network equipment unit such as an Ethernet switch or another concentrator.

In a preferred embodiment of the invention, the concentrator is itself adapted to receive a remote power feed and includes at least one predetermined impedance connected to at least two conductors of the line connected to the upstream network equipment unit and which is characteristic of the power supply input of equipment units that are adapted to receive a remote power feed.

The resulting concentrator can be inserted into a line without compromising the advantages for that line of the remote power feed, because it can itself be detected as adapted to receive a remote power feed and therefore receive a remote power feed.

BRIEF DESCRIPTION OF THE DRAWINGS

Other features and advantages of the present invention will become more clearly apparent on reading the following description, which is given with reference to the corresponding accompanying drawings, in which:

FIG. 1, already commented on, is a diagram showing the architecture of an Ethernet local area network in which the method of the invention can be used.

FIG. 2 is a block diagram of a first embodiment of a remote power feed unit located in a concentrator and of a first embodiment of a terminal receiving a remote power feed, where the remote power feed is provided via a common mode phantom circuit on the pairs for sending and receiving data.

FIG. 3 shows the principle of detecting a terminal adapted to receive a remote power feed.

FIG. 4 is a block diagram of a variant of the terminal receiving a remote power feed, that variant enabling use of a local power supply under normal circumstances and a remote power feed in the event of failure of the local power supply, in particular in the event of a mains power outage.

FIG. 5 is a more detailed block diagram of the first embodiment of the remote power feed unit shown in FIG. 2.

FIG. 6 is a diagram showing changes of state occurring in the embodiment shown in FIG. 5.

FIG. 7 is a block diagram of a second embodiment of a remote power feed unit located in a concentrator and a second embodiment of a terminal receiving a remote power feed, where the remote power feed is provided via a common mode phantom circuit on the pairs for sending and receiving data and simultaneously via at least one other available pair.

FIG. 8 is a more detailed block diagram of the second embodiment of the remote power feed unit shown in FIG. 7.

FIG. 9 is a diagram showing changes of state occurring in the embodiment shown in FIG. 8.

FIG. 10 is a block diagram of one embodiment of a repeater in accordance with the invention and shows its use in a line in which the remote power feed is provided only by a phantom circuit.

FIG. 11 is a block diagram of the same embodiment of a repeater according to the invention but this time used in a line in which the remote power feed is provided via a phantom circuit plus two available pairs.

FIG. 12 is a block diagram of one embodiment of a concentrator according to the invention adapted to receive a remote power feed and shows its use in a line where the remote power feed is provided by a phantom circuit plus two available pairs, fed with power by a remote power feed unit located in an Ethernet switch.

FIGS. 13 to 16 show preferred embodiments of parts of the embodiment shown in FIG. 8.

MORE DETAILED DESCRIPTION

FIG. 2 is a block diagram of a first embodiment of a remote power feed unit located in a concentrator 3 and a first embodiment of a terminal $5_1$ adapted to receive a remote power feed, where the remote power feed is provided via a common mode phantom circuit on pairs for sending and receiving data. The line L3 includes four pairs:

pairs A1, A2 are not used, pairs B1, B2 are not used, pairs C1, C2 are used to send data to the network, in differential mode, and pairs D1, D2 are used to send data to the terminal, in differential mode.

The pairs C1, C2 and D1, D2 are also used in common mode to provide a remote power feed to the terminal $5_1$ via a phantom circuit.

The concentrator 3 includes a remote power feed unit 31 and a combiner 32. The unit 31 is adapted to detect the presence of a terminal adapted to receive a remote power feed. The combiner 32 includes two transformers 33 and 34 respectively transmitting a signal Tx to be sent to a terminal and a signal Rx received from a terminal. The transformers each have a first winding and a second winding. The first windings are respectively connected to the pairs D1, D2 and C1, C2. They each have a center-tap connected to a respective output of the remote power feed unit 31 adapted to detect the presence of a terminal adapted to receive a remote power feed. The second windings are connected to other units of the concentrator 3, not shown.

The terminal $5_1$ includes a splitter 20 and a power supply unit 22. The splitter 20 includes two transformers 41 and 40 respectively for transmitting a signal Tx' to be sent to the concentrator 3 and for transmitting a signal Rx' received by the terminal $5_1$. They each have a first winding and a second winding. The first windings are respectively connected to the pairs D1, D2 and C1, C2. They each have a center-tap connected to a respective input of the power supply unit 22.

An impedance 21 shunts the power supply input 22. The impedance 21 makes it possible to recognize the terminal as one that is adapted to receive a remote power feed. The impedance 21 and the frequency of the detection signal are chosen so that the modulus of the impedance 21 is very much less than 75 ohms. The impedance 21 is chosen so that it does not short-circuit the DC voltage applied to the power supply 22 and is easy to distinguish from terminations routinely connected to the available conductors of the RJ45 connectors of terminals. The impedance 21 is preferably a capacitor with a capacitance of not less than 1 microfarad, for example 50 microfarads. If the power supply unit 22 is a DC-DC converter which reduces the voltage, the capacitor 21 can be the filter capacitor provided as standard at the input of a DC-DC converter, because the power supply unit 22 shunts the impedance 21. In this case, there is no need to add a component to constitute the impedance 21, which simplifies the production of the terminal.

IEEE Standard 802.3 requires the pairs for sending and receiving data to be able to withstand a common mode voltage of 25 V at a frequency up to 500 kHz, which means that a sinusoidal test signal at a voltage of a few volts and at a frequency of the order of 10 kHz does not interfere with the transmission of payload data.

FIG. 3 shows the principle of discriminating terminals that are adapted to receive a remote power feed and terminals that are not. For example, a terminal $5_1$ that is adapted to receive a remote power feed includes a capacitor 21 having a capacitance of 50 microfarads. That capacitance must be distinguished from an Ethernet line termination, for example on a personal computer PC. That termination typically includes, for each pair P1, P2 of the line, two resistors 37 and 38, each having a resistance of 75 ohms and each having one terminal connected to one conductor of the pair in question and another terminal connected to a reference potential via a capacitor 39 whose capacitance is less than or equal to 100 nanofarads. In a variant (not shown), both ends of the line are connected to a short-circuit connected to the reference potential via a 75 ohms resistor in series with a capacitor having a capacitance less than or equal to 100 nanofarads.

Each conductor of the pair P1, P2 has a resistance of the order of 20 ohms. For a sinusoidal signal at 10 kHz, for example, the modulus of the impedance $Z_{term}$ measured at the end of the line is therefore always significantly greater than 150 ohms when a conventional termination is connected to the pair. On the other hand, it is always significantly less than 150 ohms when a capacitance of 1 microfarad or more is connected to the pair. It is therefore sufficient to determine if the modulus of the impedance $Z_{term}$ is less then or greater than 150 ohms, for example, to determine whether a terminal adapted to receive a remote power feed is present at the end of the line or not.

In a variant, instead of providing a remote power feed via a phantom circuit, and depending on the power required by the terminal, a remote power feed can be provided:

via A1, A2 only, or via B1, B2 only, or via A1, A2, B1 and B2 simultaneously, or via A1, A2, B1, B2 and the phantom circuit simultaneously.

In a variant, the unit 31 and the combiner 32 can be in a separate module and completely independent of the repeater 3, that module being simply inserted into the line L.

FIG. 4 shows the block diagram of a variant $5_2$ of a terminal according to the invention using a local power supply under normal circumstances and a remote power feed in the event of failure of the local power supply, in particular in the event of a mains power outage. The remote power feed circuit uses the available pair A1, A2, for example, but operation is exactly the same if it uses a phantom circuit supported by the pairs for sending and receiving data.

Components that are identical to those of the terminal $5_1$ are identified by the same reference numbers. The terminal $5_2$ further includes a conventional mains power supply unit 24 providing a DC voltage of 50 volts, for example, if the remote power feed voltage is 48 volts. The positive pole of the mains power supply unit 24 is connected to a positive input of the power supply unit 22 via a diode D1. The positive pole of the remote power feed circuit is connected to the positive input of the power supply unit 22 via a diode D2. In normal operation, the diode D1 conducts and the diode D2 does not conduct, because of the difference between the two supply voltages. In the event of a mains power outage, the voltage provided by the mains power supply unit 24 disappears, the diode D2 conducts and the diode D1 does not conduct. The power supply unit 22 can therefore continue to operate from the remote power feed.

A capacitor 23 shunts the diode D2 to pass an alternating current signal for detecting the terminal type. Its capacitance is chosen so that it offers a negligible impedance to the detection signal, for example 1 microfarad. A terminal with a local power supply backed up by a remote power feed can therefore be detected as a terminal with a permanent remote power feed.

The remote power feed current can be reserved for essential functions of the terminal during mains power outages and not for other, non-essential functions which consume large quantities of energy.

FIG. 5 is a more detailed block diagram of the first embodiment of the remote power feed unit 31 shown in FIG. 2. The first embodiment includes:

a switch 44 having three inputs and one output, which output is connected to the center-tap of the transformer 33 via a resistor R2 shunted by a capacitor C1, an AC test voltage generator 45 providing a sinusoidal signal at a voltage of a few volts and at a frequency of 10 kHz, for example, having one terminal connected to the center-tap of the transformer 34 and another terminal connected to a first terminal of a resistor R1; the second terminal of the resistor R1 is connected to a first input of the switch 44, a DC voltage generator 46 providing a voltage of 48 V, for example, for remote power feeding a terminal, having a negative terminal connected to the center-tap of the transformer 34 and a positive terminal connected to a first terminal of a resistor R3 via an inductor 49; the second terminal of the resistor R3 is connected to a second input of the switch 44, a DC test voltage generator 47 producing a voltage of 5 volts, for example, having a positive terminal connected to the center-tap of the transformer 34 and a negative terminal connected to a third input of the switch 44, and a logic circuit 43 having a first input connected to the second terminal of the resistor R1, two further inputs respectively connected to the terminals of the resistor R2 and the capacitor C1, and an output which controls the switch 44.

In the above example:

R1=75 ohms,
R2=1 ohm,
R3=10 ohms,
C1=1 microfarad.

The inductor 49 in series with the generator 46 has an inductance such that, if the generators 45 and 46 are connected to the remote terminal simultaneously, the attenuation of the AC test signal caused by the generator 46 is negligible. In other embodiments this function can be implemented by an active circuit.

The resistance of R2 is chosen to define the maximum remote power feed current in the line and the capacitance of C1 is chosen to transmit the AC detection signal with negligible attenuation. The voltage of the AC generator 45 and the resistance of the resistor R1 are chosen to pass a test current that is not hazardous for any terminal that might be connected to the end of the line, in particular if it is a terminal not adapted to receive a remote power feed. The DC test voltage provided by the generator 47 is very much lower than the remote power feed voltage and is therefore not hazardous to terminals which are not adapted to receive a remote power feed. Also, it is insufficient to start up the power supply of a terminal adapted to receive a remote power feed, which is therefore seen as an open circuit during the direct current test.

FIG. 6 is a diagram showing changes of state that occur in the embodiment of the unit 31 shown in FIG. 5. When the unit 31 is started up, it is in a state S1 and performs an alternating current test to detect the presence of a terminal adapted to receive a remote power feed: the logic circuit 43 operates the switch 44 to connect only its first input to its output. The remote power feed voltage is not applied to the line L, and there is therefore no risk to a conventional terminal. The switch 44 transmits an alternating current. The logic circuit 43 compares the AC voltage at the second terminal of the resistor R1 with a threshold voltage corresponding to a modulus of the impedance $Z_{term}$ equal to 50 ohms, for example. There are two possible outcomes:

Event 102: the modulus is greater than 50 ohms, this is an open circuit for the alternating current, there is therefore no terminal connected to the end of the line and the circuit 43 remains in state S1 to continue the alternating current test.

Event 101: the modulus is less than 50 ohms, there is a short-circuit for alternating current at least, and therefore there may be a terminal adapted to receive a remote power feed connected to the end of the line, or a short-circuit between two conductors of the line; the circuit 43 goes to the state S2 for discriminating between these two possibilities, by means of a low voltage direct current test of short duration. During this test the power supply unit 22 has a high resistance because the input voltage it receives is too low to start it up.

The test conducted in state S2 has two possible outcomes:

Event 105: the resistance is greater than 50 ohms, which is an open circuit for the direct current, and there is therefore no conventional terminal connected to the end of the line; the terminal is one adapted to receive a remote power feed or a terminal with a local power supply backed up by a remote power feed. The circuit 43 goes to a state S4 to remote power feed the terminal and continues the alternating current test to detect disconnection of the terminal which has been detected.

Event 104: the modulus is less than 50 ohms, and there is therefore a short-circuit for the direct current in the terminal or on the line; there is therefore either a conventional terminal (having a termination including a short-circuit) connected to the line, or an accidental short-circuit, in which case the remote power feed current must not be sent; the circuit 43 goes to state S3 to detect disappearance of the short-circuit.

In state S3, the circuit 43 performs a low DC voltage test of short duration to detect the disconnection of a conventional terminal, for example at periods of one second. The unit 31 provides a direct current of sufficiently low amplitude and sufficiently short duration to test for the presence of a conventional terminal with no risk of damaging it. The circuit 43 operates the switch 44 to connect only its second input to its output, for a period of only 150 milliseconds. At the end of 100 milliseconds (required to enable any capacitor to charge), the circuit 43 measures the voltage across R2. If the voltage is zero, the circuit is an open circuit for the direct current. The remote power feed voltage is not applied to the line L during this test. The test voltage applied is 5 volts in this example. This does not represent any danger to the terminal. The logic circuit 43 compares the DC voltage measured across the resistor R2 with a single threshold voltage, corresponding to a resistance of 50 ohms, for example.

The test is repeated until the modulus of the impedance exceeds 50 ohms (Event 106): the circuit 41 then reverts to state S1 so that it can detect the connection of a terminal adapted to receive a remote power feed.

In state S4 the unit 31 supplies a remote power feed current to the terminal adapted to receive a remote feed that it has detected, and detects the occurrence of two events:

disconnection of the terminal adapted to receive a remote power feed which has been detected, or failure of the line or the terminal, producing a short-circuit for direct current.

The circuit 43 operates the switch 44 to connect its first and third inputs simultaneously to its output. A remote power feed current is therefore supplied to the line L. The generator 45 provides a permanent alternating current superimposed on the remote power feed direct current to monitor the presence of the terminal adapted to receive a remote power feed that has been detected. A direct current flows in the resistor R2 for as long as the terminal adapted to receive a remote power feed that has been detected is connected to the line L. The circuit 43 monitors the voltage drop across the resistor R2. It compares the AC voltage at the second terminal of the resistor R1 with a threshold voltage corresponding to a modulus of the impedance $Z_{term}$ equal to 50 ohms. It also compares the DC voltage across R2 with a threshold voltage corresponding to a resistance of 50 ohms.

Two events can occur in state S4:

Event 107: the modulus of the alternating current impedance rises above 50 ohms, the circuit is an open circuit for the alternating current, and the terminal adapted to receive a remote power feed has therefore been disconnected; the circuit 43 reverts to state S1. Because the remote power feed voltage is no longer applied to the line, any other terminal can be connected in complete safety.

Event 108: the DC resistance is less than 50 ohms and there is therefore a short-circuit either on the line or in the terminal. The circuit 43 goes to a state S5 in which it stops the remote power feed for 30 seconds, for example, to prevent the remote power feed current from causing any damage. It then reverts to state S1 in which the tests previously conducted are repeated.

FIG. 7 is a block diagram of a second embodiment of the remote power feed unit 31' located in a concentrator 3' and a second embodiment of a terminal 5₂ adapted to receive a remote power feed. This second embodiment is used to power terminals requiring a current that is too high to be provided only by the phantom circuit using the pairs for sending and receiving data or only by the available two pairs. The remote power feed current can be divided equally between the four pairs of the line, i.e. the phantom circuit plus the available two pairs. This enables the remote power feed current to be doubled. However, it is then necessary to verify that the terminal is adapted to receive a remote power feed current on all the pairs. If the remote power feed unit were to test only the phantom circuit and were then to apply the remote power feed voltage to all the pairs, it could destroy terminations at the ends of the available pairs in terminals adapted to receive a remote power feed only via the phantom circuit.

The remote power feed unit 31' for detecting a terminal adapted to receive a remote power feed shown in FIGS. 7 and 8 verifies that the terminal is adapted to receive a remote power feed via the phantom circuit and that the terminal is further adapted to receive a remote power feed via the available two pairs. It can therefore distinguish between terminals of three types:

a terminal which is not adapted to receive a remote power feed, a terminal that is adapted to receive a remote power feed only via the phantom circuit, and a terminal that is adapted to receive a remote power feed via the phantom circuit and via the two available pairs.

The skilled person knows how to adapt the unit 31' to permutate the test on the available pairs and the test on the phantom circuit to distinguish between terminals of three types:

a terminal that is not adapted to receive a remote power feed, a terminal that is adapted to receive a remote power feed only via the available pairs, and a terminal that is adapted to receive a remote power feed via the phantom circuit and via the two available pairs.

In this example the unit 31' has four ports. Two ports are connected to the center-taps of respective transformers 33 and 34. The common mode phantom circuit uses the two pairs C1, C2 and D1, D2 for sending and receiving data. A third port is connected to the available conductors A1 and B1. A fourth port is connected to the available conductors A2 and B2.

In the terminal 5₂, the ends of the conductors A1 and B1 are connected together to a first port of the power supply 22 and are connected via a short circuit 51 to the center-tap of the transformer 41, i.e. to one terminal of the phantom circuit. The ends of the conductors A2 and B2 are connected together to a second port of the power supply unit 22 and are connected via a short circuit 52 to the center-tap of the transformer 40, i.e. to the other terminal of the phantom circuit. As previously, a capacitor 21 shunts the two ports of the power supply unit 22.

The unit 31' sends half the remote power feed current via the phantom circuit and the other half via the pairs A1, A2, B1, B2. The AC test signal is superimposed on the remote power feed current.

FIG. 8 is a more detailed block diagram of the second embodiment of the remote power feed unit shown in FIG. 7. The remote power feed unit 31' for detecting terminals adapted to receive a remote power feed includes, in addition to the components constituting the unit 31 previously described:

a resistor R4 connected at one end to the common point of the resistor R3 and the inductor 49, and a second switch 48 having one input, one output and one control input.

The logic circuit 43 is replaced by a logic circuit 43' which controls the switches 44 and 48. The input of the switch 48 is connected to a second end of the resistor R4. R4 has the same resistance as R3; R3 and R4 divide the remote power feed current equally between the phantom circuit and the circuit via the pairs A1, A2, B1, B2. The output of the switch 48 is connected to the conductors A2 and B2 of the line L. The conductors A1 and B1 are connected to the common point of the generator 45, the generator 47, the generator 46 and the center-tap of the transformer 34.

FIG. 9 is a diagram showing changes of state occurring in the embodiment shown in FIG. 8. On start-up, and until the terminal has been identified as adapted to receive a remote power feed via the phantom circuit and via the available pairs, the input of the switch 48 is not connected to its output. The generator 46 therefore does not apply any voltage to the terminal. The states are the same as for the unit 31, except that event 105, which detects an open circuit for direct current which indicates that the terminal is a terminal adapted to receive a remote power feed via the phantom circuit (or has a local power supply backed up by the remote power feed), is not followed immediately by state S4 in which the terminal receives the remote power feed.

The unit 31' goes to a state S4a in which the circuit 43' carries out a short duration low DC voltage test to test also the available pairs A1, A2, B1, B2. It operates the switch 44 to connect only its second input to its output for only 150 milliseconds. The logic circuit 43' verifies that there is a DC voltage on the conductors A2, B2.

Event 111: The circuit 43' has detected a return DC voltage on the conductors A2, B2 because the phantom circuit (at the center-tap of the transformer 40) is connected to those conductors in the terminal by the short-circuit 52. This means that the terminal is also adapted to receive a remote power feed via the available pairs. The circuit 43' operates the switch 48 so that it connects its input and its output. The generator 46 therefore applies a remote power feed voltage to the available pairs. The circuit 43' then goes to a state S4b analogous to the state S4 previously described, in which it provides a remote power feed to the terminal via the phantom circuit in addition to the remote power feed via the available pairs.

Event 110: The circuit 43' has not detected a DC voltage on the conductors A2, B2 because the phantom circuit is not connected to those conductors in the terminal. This means that the terminal is not adapted to receive a remote power feed via the available pairs. The circuit 43' leaves the switch 48 open. The generator 46 therefore applies no remote power feed voltage to the available pairs and there is no risk of damaging the terminal. The circuit 43' then goes to a state S4b identical to the state S4 previously described, in which it provides a remote power feed to the terminal via the phantom circuit only.

FIG. 10 is a block diagram of one embodiment of a repeater RP1 according to the invention, and shows its use in a line in which the remote power feed is provided only via a phantom circuit. In a repeater 3, each port includes a remote power feed unit 31 as previously described and providing the remote power feed and detection functions. The port considered in this example is connected to a terminal $4_1$ via the repeater RP1, which is necessary because of the length of the line. The concentrator 3 is connected to the repeater RP1 by a line section L1. The terminal $4_1$ is connected to the repeater RP1 by a line section L2 and includes: a splitter consisting of two transformers 40 and 41, a power supply unit 22 and a capacitor 21 shunting the input terminals of the power supply unit 22, as previously described.

The repeater RP1 includes:
a splitter 139 and a combiner 132,
a power supply unit 122, and
two regenerators 35 and 36.

The combiner 132 includes two transformers 133 and 134 respectively transmitting a signal to be sent to the terminal $4_1$ and a signal received from the terminal $4_1$. Each has a first winding and a second winding. The first windings are connected to respective data transmission pairs of the line $L_2$. Each has a center-tap. The second winding of the transformer 133 is connected to differential outputs of the regenerator 35. The second winding of the transformer 134 is connected to differential inputs of the regenerator 36.

The splitter 139 includes two transformers 140 and 141 respectively transmitting the signal to be sent to the concentrator 3 and the signal received from the concentrator 3. Each has a first winding and a second winding. The first windings are connected to respective data transmission pairs of the line $L_1$. The center-tap of the first winding of the transformer 140 is connected to a first input of the power supply unit 122 and to the center-tap of the transformer 133. The center-tap of the first winding of the transformer 141 is connected to a second input of the power supply unit 122 and to the center-tap of the transformer 134. The second winding of the transformer 141 is connected to differential outputs of the regenerator circuit 36. The second winding of the transformer 140 is connected to differential outputs of the regenerator circuit 35.

The connections between the center-taps of the transformers 140, 141, 133, 134 enable the phantom circuit of the section L1 to be connected directly to the phantom circuit of the section L2 to carry the remote power feed direct current and test signals (direct current and alternating current). There is no capacitor connected to the input of the power supply unit 122 of the repeater. The power supply unit is designed to have an input impedance whose modulus is very much higher than 50 ohms during the alternating current test. The repeater RP1 must receive a remote power feed from the remote power feed unit 31 only when a terminal $4_1$ adapted to receive a remote power feed is actually connected to the repeater RP1. The repeater RP1 on its own must therefore not be detected as a terminal adapted to receive a remote power feed. The skilled person knows how to design a power supply unit 122 having an input impedance very much higher than 50 ohms for the alternating current test signal. For example, the input stage of the power supply unit can include an inductor or an active circuit equivalent to an inductor.

During the alternating current test (state S1, FIG. 6), the remote power feed unit 31 detects a closed circuit for alternating current if and only if a terminal $4_1$ adapted to receive a remote power feed is connected, by means of the capacitor 21 in the terminal $4_1$. Thereafter, during the direct current test (state S2), the power supply unit 122 and the power supply unit 22 each have a high resistance because they receive an input voltage which is too low to start them. If the remote power feed unit 31 finds that there is no direct current short-circuit, it concludes that a terminal adapted to receive a remote power feed is connected. The repeater is therefore transparent vis-à-vis the remote power feed unit 31.

FIG. 11 is a block diagram of the same embodiment of a repeater according to the invention, but showing its use in a line where the remote power feed is provided by a phantom circuit plus two available pairs A1, A2 and B1, B2. The two available pairs are used only in the line section L1 because they provide the surplus energy corresponding to the requirements of the circuits of the repeater RP1. The two conductors A1 and A2 together connect the center-tap of the transformer 33 to the center-tap of the transformer 140. The two conductors B1 and B2 together connect the center-tap of the transformer 34 to the center-tap of the transformer 141.

FIG. 12 is a block diagram of one embodiment of a concentrator 3' according to the invention. In an Ethernet switch 2', a remote power feed unit 231 and a combiner consisting of two transformers 201 and 202 analogous to those previously described for a concentrator 3 provide the remote power feed and detection functions for the port in question of the switch 2'. The concentrator 3' is connected to that port. It has N ports connected to N respective terminals $5_1, \ldots, 5_N$ by individual lines L.

The concentrator 3' is adapted to receive a remote power feed, and it receives its remote power feed via a phantom circuit on two pairs D1, D2, C1, C2 plus two available pairs B1, B2, A1, A2 of the line to the switch 2' powered by the remote power feed unit 231 in the switch 2'.

In the concentrator 3', each port includes a respective remote power feed unit $231_1, \ldots, 231_N$ analogous to the unit 31 previously described and a respective combiner $232_1, \ldots, 232_N$, analogous to the combiner 32 previously described; they provide the remote power feed and detection functions. The concentrator 3' further includes:
a splitter 240,
a power supply unit 222,
a capacitor 221 shunting the input of the power supply unit 222, and
a conventional concentrator 200.

For example, the combiner $232_1$ includes two transformers 233 and 234 respectively transmitting a signal to be sent to a terminal $6_1$ and a signal received from the terminal $6_1$. They each have a first winding and a second winding. The first windings are connected to respective data transmission pairs of the line L to the terminal $6_1$. Each has a center-tap. The second winding of the transformer 233 is connected to differential outputs of the concentrator circuit 200. The second winding of the transformer 234 is connected to differential inputs of the concentrator circuits 200.

The splitter 239 includes two transformers 240 and 241 respectively transmitting the signal received from the concentrator 2' and the signal to be sent to the concentrator 2'. They each have a first winding and a second winding. The first windings are connected to respective data transmission pairs D1, D2, C1, C2. The center-tap of the first winding of the transformer 240 is connected to a first input of the power supply unit 222, a first input of each remote power feed unit $231_1, \ldots, 231_N$, and the available wires A1, B1. The center-tap of the first winding of the transformer 241 is connected to a second input of the power supply unit 222, a second input of each remote power feed unit $231_1, \ldots, 231_N$, and the available wires A2, B2. The second winding of the transformer 141 is connected to differential outputs of the concentrator 200. The second winding of the transformer 240 is connected to differential inputs of the concentrator 200.

The concentrator 3' requires a remote power feed regardless of the terminals to which it is connected. Even if none of those terminals is adapted to receive a remote power feed, they require the concentrator 3' in order to be able to operate. The concentrator 3' is detected by the remote power feed unit 231 as being a terminal adapted to receive a remote power feed, because of the capacitor 121 (whose capacitance is at least equal to one microfarad). This capacitor can be the filter capacitor conventionally included at the input of a power supply unit.

FIG. 13 shows part of the block diagram of a variant of the embodiment shown in FIG. 8. Of the three switches 44, the one which is connected to the resistor R3, on the one hand, and to the resistor R2, on the other hand, preferably consists of an electronic circuit 44' shown in FIG. 16. The switch 48 which is connected to the resistor R4, on the one hand, and to the conductors A2 and B2, on the other hand, preferably consists of an electronic circuit 48' identical to the switch 44'. The inductor 49 is preferably replaced with an electronic circuit 49' for blocking an alternating current, namely the respective circuits 49'*a* and 49'*b* shown in FIGS. 14 and 15.

FIG. 14 is the block diagram of a preferred first embodiment 49'*a* of the electronic circuit 49' for blocking an alternating current. This example includes three silicon diodes D5, D6, D7. The alternating current test signal generator applies to the terminals of the circuit 49'*a* an AC voltage which in this example is equal to 1.2 volts. The current/voltage characteristic of any silicon diode is non-linear and has a threshold of approximately 0.6 volt. Beyond that threshold, the dynamic resistance is negligible. The diodes D5, D6, D7 have a combined threshold of approximately 1.8 volts. They therefore have a negligible conductance for the alternating current test signal when the remote power feed current is not flowing through them.

That signal is therefore not absorbed by the DC voltage generator 46 if no terminal adapted to receive a remote power feed is connected to the line. If a terminal adapted to receive a remote power feed is connected to the line, the alternating current test signal is absorbed but this is of no importance because at this time the test signal does not need to be used to detect the disconnection of a terminal. The skilled person knows how to adapt the number of semiconductor diodes to suit the voltage of the alternating current test signal.

FIG. 15 is the block diagram of a preferred second embodiment 49'*b* of the electronic circuit 49' for blocking an alternating current, which includes at least one transistor behaving as a direct current generator. The electronic circuit 49'*b* includes a bipolar transistor T1 whose collector and emitter constitute respective terminals of the circuit 49'*b*. The base is connected to a bridge made up of two resistors R6 and R7 connected between these two terminals. A capacitor C4 is connected between the base and the emitter. The time constant of the circuit 49'*b* as a whole is made very much greater than the period of the alternating current test signal. It can be shown by calculation that the circuit then has a negligible conductance for the alternating current signal.

FIG. 16 is the block diagram of a preferred embodiment of the electronic switching circuits 44' and 48'. Each includes, in addition to at least one active component:
  means for turning it on and off to activate or deactivate the remote power feed current, and
  means for controlling it in such manner as to limit the remote power feed current to a predetermined current that is not hazardous to the line or the generator 46.

To be more precise, in this example, the circuit 44' or 48' includes:
  a port 71 which is coupled to the conductors D1 and D2 (FIG. 8), respectively A2 and B2,
  a control port 72 connected to the control circuit 43' (FIG. 8),
  a port 73 which is connected to the resistor R3, respectively R4,
  an MOS transistor T4 whose drain is connected to the port 71 and whose source is connected to the port 73 via a resistor R11,
  an NPN bipolar transistor T3 whose collector is connected to the gate of the transistor T4, whose emitter is connected to a supply voltage −V via a resistor R9, and whose base is connected to the control port 72,
  an NPN bipolar transistor T5 whose collector is connected to the gate of the transistor T4, whose emitter is connected to the port 73, and whose base is connected to the drain of the transistor T4, and
  a resistor R10 connecting the gate of the transistor T4 to the port 73.

A binary control signal is applied to the port 72. When it turns off the transistor T3, the transistor T4 is turned off and the remote power feed is cut off. When it saturates the transistor T3, the transistor T4 conducts and the remote power feed is applied. The voltage drop in the resistor R11 caused by the remote power feed current turns on the transistor T5 when it reaches a threshold voltage. The transistor T5 then reduces the conductance of the transistor T4. This current regulation limits the remote power feed current to a maximum current essentially determined by the resistance of the resistor R11, the ratio of the resistances of the resistors R9 and R10, and the voltage −V. To complete the protection of the generator 46 against short-circuits, a fuse can be inserted as close as possible to the positive terminal of the generator 46.

In a variant, the circuit 44', 48' further includes means for controlling the active component so that it has a negligible conductance for the test alternating current. For example, a capacitor C5 can be connected between the gate of the transistor T4 and the port 73. The transistor T4 then behaves as a direct current generator, presenting a high impedance to the alternating current test signal generator, in particular when the transistor T5 is not turned on. The time constant of the circuit as a whole is chosen so that the transistor T4 has a negligible conductance vis-à-vis the alternating current test signal. There is then no longer any need for the blocking device 49 or 49'.

What is claimed is:

1. A method of providing a remote power feed to a terminal in a local area network, the method comprising:
  producing at least one detection signal on at least two conductors of a line for connecting the local area network to a remote terminal, that signal having an energy such that the terminal cannot be damaged under any circumstances,
  detecting the presence of a remote terminal adapted to receive a remote power feed by detecting the presence of predetermined impedance in the remote terminal on the basis of a current created by the test signal in that line, and sending a power supply current in that line when the presence of a terminal adapted to receive a remote power feed is detected.

2. A remote power feed method according to claim 1, wherein, to detect a predetermined impedance in the remote terminal, the method detects the presence of a capacitor in the remote terminal.

3. A remote power feed method according to claim 2, wherein, to detect the presence of a capacitor in the remote terminal:

an alternating current test signal is applied to the line and it is verified that the remote terminal does not behave like an open circuit for that signal, a direct current test signal is applied to the line and it is verified that the remote terminal behaves like an open circuit for that signal, and the method concludes that a terminal adapted to receive a remote power feed is present if the results of both tests are positive.

4. A remote power feed method according to claim 1, wherein, to detect a predetermined impedance in the remote terminal, the method detects the presence of a short-circuit in the remote terminal.

5. A remote power feed method according to claim 1, suited to a line including two pairs for sending/receiving data and each enabling the transmission of a remote power feed current in common mode and other conductors which can also be used for a remote power feed, wherein detecting a remote terminal adapted to receive a remote power feed comprises:

performing a first test to detect if the terminal is adapted to receive a remote power feed via the two pairs for sending/receiving data, performing a second test to detect if the terminal is adapted to receive a remote power feed via the other conductors that can also be used for a remote power feed, sending a remote power feed current in the two pairs for sending/receiving data only if the first test shows that the terminal is adapted to receive a remote power feed via those two pairs, and sending a remote power feed current in the other conductors that can also be used for a remote power feed only if the second test shows that the terminal is adapted to receive a remote power feed via those other conductors.

6. A remote power feed method according to claim 5, wherein the first test comprises of detecting the presence of a first predetermined impedance in the terminal on the basis of a current created by a first test signal in the two pairs for sending/receiving data and the second test comprises of detecting the presence of a second predetermined impedance in the terminal on the basis of a current created by a second test signal in the other conductors.

7. A remote power feed method according to claim 6, wherein one of the two predetermined impedances is a short-circuit and the other predetermined impedance is a capacitance.

8. A remote power feed unit for implementing the method according to claim 1, wherein the unit includes:

means for producing at least one detection signal on at least two conductors of a line for connecting the local area network to a remote terminal, that signal having an energy such that the terminal cannot be damaged under any circumstance, means for detecting the presence of a remote terminal adapted to receive a remote power feed by detecting the presence of a predetermined impedance in the remote terminal on the basis of a current created by the test signal in that connection, and means for sending a power supply current in the line when the presence of a terminal adapted to receive a remote power feed is detected.

9. A system according to claim 8, wherein the means for detecting a predetermined impedance in the remote terminal include means for detecting the presence of a capacitor in the remote terminal.

10. A system according to claim 8, wherein the means for detecting a predetermined impedance in the remote terminal include means for detecting the presence of a direct current short-circuit in the remote terminal.

11. A system according to claim 9, wherein the means for detecting the presence of a capacitor in the remote terminal include:

means for applying an alternating current test signal to the line and verifying that the remote terminal does not behave like an open circuit for that signal, means for applying a direct current test signal to the line and verifying that the remote terminal behaves like an open circuit for that signal, and logic means for concluding that a terminal adapted to receive a remote power feed is present if the results of both tests are positive.

12. A system according to claim 10, wherein the means for detecting the presence of a short-circuit in the remote terminal include:

means for applying a direct current test signal to the line, and means for detecting if the remote terminal behaves like a short-circuit for that signal and concluding that a terminal adapted to receive a remote power feed is present if the result of the test is positive.

13. A system according to claim 8, further including:

means for detecting disconnection of the terminal adapted to receive a remote power feed, and means for interrupting the remote power feed current in response to detection of disconnection of the terminal.

14. A system according to claim 8, wherein means for detecting disconnection of a terminal adapted to receive a remote power feed include:

means for applying an alternating current test signal to the line, and means for verifying if the terminal behaves like an open circuit for that test signal.

15. A system according to claim 8, further including:

means for detecting a short-circuit for the remote power feed direct current on the line after sending the remote power feed current, and means for interrupting the sending of the remote power feed current for a predetermined time and then sending a remote power feed current again if a short-circuit is detected for the power supply direct current.

16. A system according to claim 8, further including:

means for concluding that a terminal that is not adapted to receive a remote power feed or a direct current short-circuit is present if the remote terminal does not behave like an open circuit for the alternating current test signal and does not behave like an open circuit for the direct current test signal, means for then applying a direct current test signal to the line to verify that the remote terminal or the short-circuit is still connected, and means for concluding that the terminal that is not adapted to receive a remote power feed or the short-circuit has been disconnected and if the result of the direct current test is negative, then the means for concluding:
applies an alternating current test signal to the line and verifies that the remote terminal does not behave like an open circuit for that signal,
applies a direct current test signal to the line and verifies that the remote terminal behaves like an open circuit for that signal, and
concludes that a terminal adapted to receive a remote power feed is present if the results of both tests are positive.

17. A system according to claim 8, suitable for a line including two pairs for sending/receiving data each enabling the common mode transmission of a remote power feed current, and other conductors that can also be used for a remote power feed, wherein the means for detecting a remote terminal adapted to receive a remote power feed include:
means for performing a first test to detect if the terminal is adapted to receive a remote power feed via the two pairs for sending/receiving data,
means for performing a second test to detect if the terminal is adapted to receive a remote power feed via the other conductors that can also be used for a remote power feed,
means for sending a remote power feed current in the two pairs for sending/receiving data only if the first test shows that the terminal is adapted to receive a remote power feed via those two pairs, and
means for sending a remote power feed current in the other conductors that can also be used for a remote power feed only if the second test shows that the terminal is adapted to receive a remote power feed via those other conductors.

18. A system according to claim 17, wherein:
the means for performing the first test include means for detecting the presence of a first predetermined impedance in the terminal on the basis of a current created by a test signal in the two pairs for sending/receiving data, and
the means for performing the second test including means for detecting the presence of a second predetermined impedance in the terminal on the basis of a current created by a test signal in the other conductors.

19. A system according to claim 18, wherein one of the two predetermined impedances is a short-circuit and the other predetermined impedance is a capacitance.

20. A system according to claim 10, wherein the means for detecting the presence of a direct current short-circuit in the remote terminal include means for limiting the duration of the test signal so that the energy dissipated in the terminal cannot damage it under any circumstances.

21. A remote power feed unit according to claim 8, wherein the means for sending a power supply current in the line include a direct current supply in series with a circuit for blocking an alternating current.

22. A remote power feed unit according to claim 21, wherein the circuit for blocking an alternating current includes at least one semiconductor diode which is conducting in the direction of the remote power feed direct current.

23. A remote power feed unit according to claim 21, wherein the circuit for blocking an alternating current includes at least one transistor behaving like a direct current generator.

24. A remote power feed unit according to claim 8, wherein the means for sending a power supply current in the line include a DC voltage supply in series with at least one electronic switching circuit including an active component and:
means for turning it on and off to active or deactivate the remote power feed current, and
means for controlling it so as to limit the remote power feed current.

25. A remote power feed unit according to claim 24, further including means for controlling the active component so that it has a negligible conductance for the test alternating current.

26. A terminal adapted to be connected to a local area network and to receive a remote power feed via a line, wherein the terminal includes at least one predetermined impedance connected to at least two conductors of the line and which identifies terminals adapted to receive a remote power feed, wherein the predetermined impedance is a very much higher capacitance than that of terminations routinely connected to the ends of the lines in terminals that are not adapted to receive a remote power feed but are adapted to be connected to the local area network.

27. A repeater adapted to receive a remote power feed and adapted to be included in a line between a network equipment unit including a remote power feed unit and another network equipment unit in a local area network,
the repeater including a power supply unit powered by a remote power feed and whose input is connected in parallel with the power supply input of the other network equipment unit to the conductors of the line that provide the remote power feed, and
the power supply unit having an input impedance whose modulus is very much higher than the modulus of the input impedance of the power supply unit which is characteristic of equipment units adapted to receive a remote power feed likely to be connected downstream of that repeater.

28. A concentrator adapted to be inserted into a line between a network equipment unit including a remote power feed unit and at least one other network equipment unit in a local area network,
the concentrator including, for each of its ports adapted to be connected to another network equipment unit, a remote power feed unit which includes:
means for producing at least one detection signal on at least two conductors of a line for connecting the concentrator to another network equipment unit, that signal having an energy such that the other network equipment unit cannot be damaged under any circumstances,
means for detecting the presence of another equipment unit adapted to receive a remote power feed by detecting the presence of a predetermined impedance in that other equipment unit on the basis of a current created by the test signal in the line, and
means for sending a power supply current in the line when the presence of another equipment unit adapted to receive a remote power feed is detected.

29. A concentrator according to claim 28, adapted to receive a remote power feed, the concentrator including at least one predetermined impedance which is connected to at least two conductors of the line and is characteristic of network equipment units adapted to receive a remote power feed.

* * * * *